Dec. 15, 1925.  1,565,422
W. T. CRAWFORD
WHEELED CARRIER FOR CORN SHELLER FEEDER EXTENSIONS
Filed March 12, 1925    2 Sheets-Sheet 2
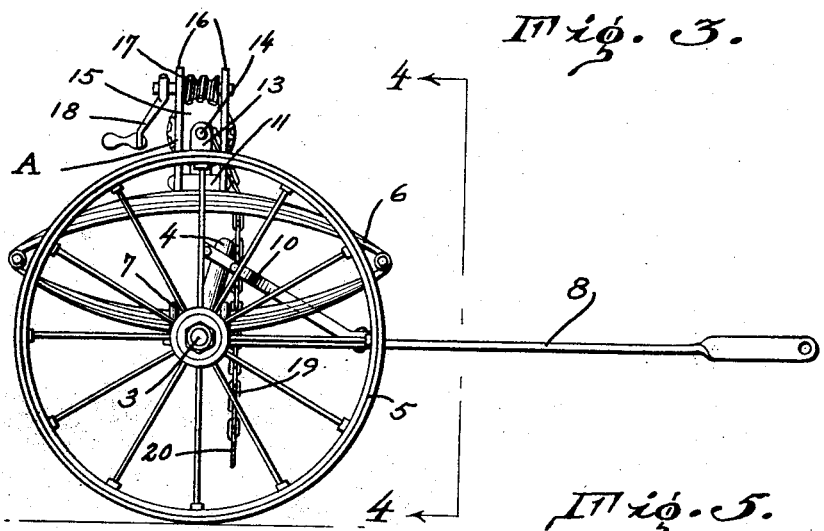
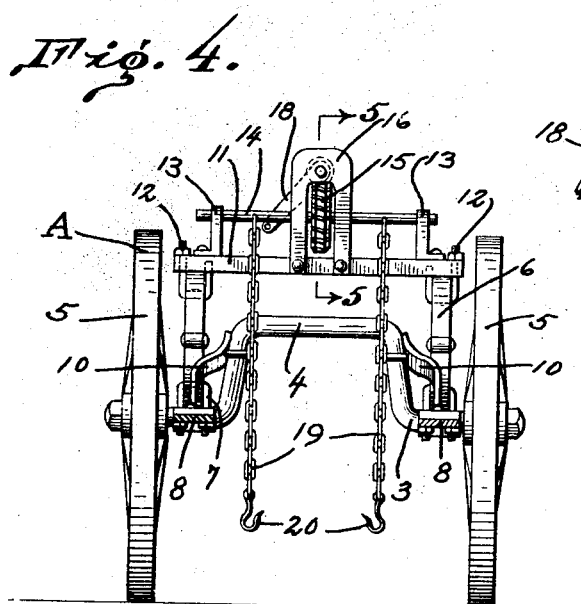
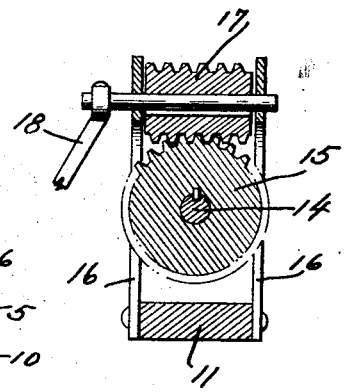
Inventor
William T. Crawford
By Jacobi & Jacobi
Attorneys Patented Dec. 15, 1925.

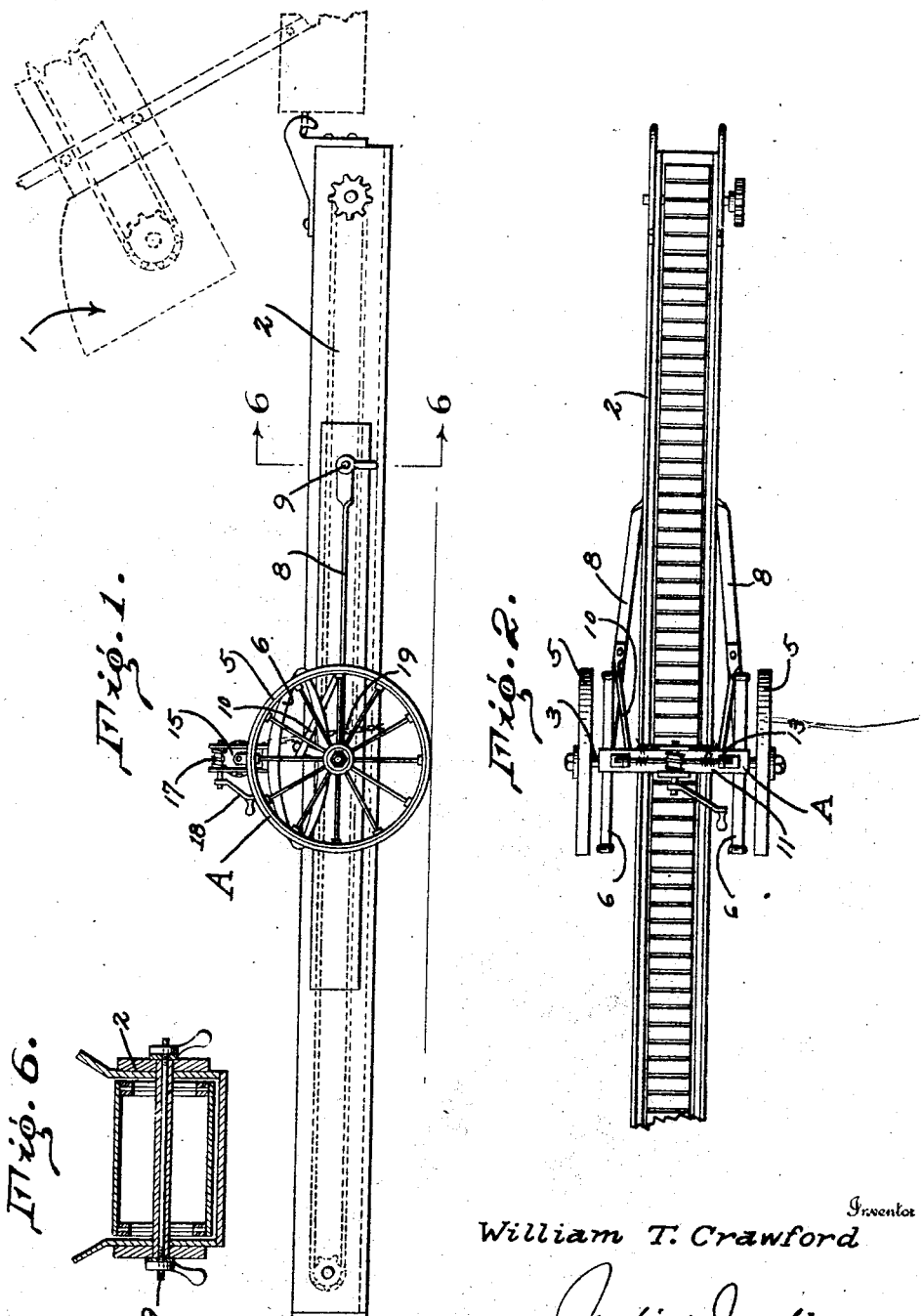

1,565,422

UNITED STATES PATENT OFFICE.

WILLIAM T. CRAWFORD, OF FLANAGAN, ILLINOIS.

WHEELED CARRIER FOR CORN-SHELLER FEEDER EXTENSIONS.

Application filed March 12, 1925. Serial No. 15,043.

*To all whom it may concern:*

Be it known that WILLIAM T. CRAWFORD, a citizen of the United States, residing at Flanagan, in the county of Livingston and State of Illinois, has invented certain new and useful Improvements in Wheeled Carriers for Corn-Sheller Feeder Extensions, of which the following is a specification.

This invention relates to new and useful improvements in devices for assisting in the transportation of agricultural implements and is more particularly adapted for use in supporting the extension feeder of a corn sheller in an elevated position whereby the extension will not drag along the ground while the corn sheller is being moved.

Heretofore the extension feeders of corn shellers have been constructed in sections whereby the same may be readily disassembled and removed from the corn sheller when it is desirous of moving the agricultural machine from one place to another. This necessitates the loss of considerable time as well as labor and by constructing a wheeled carrier for the feeder extension the loss of time and labor is obviated and injury to the feeder is prevented during the transportation of the machine.

A still further object of the invention is to provide a device of the above mentioned character, which is of such a construction as to enable the same to be easily and quickly placed in use and does not require the necessity of employing a number of complicated tools or parts in order to place the same in position with respect to the feeder extension.

Another important object is to provide a device of the above mentioned character, which is simple in construction, inexpensive, strong and durable and further well adapted for the purposes for which it is designated.

Other objects and advantages of this invention will become apparent during the course of the following description.

In the accompanying drawings forming a part of this specification and in which like numerals designate like parts throughout the same,—

Figure 1 is a side elevation showing my invention in use.

Figure 2 is a plan view thereof.

Figure 3 is a front elevation of my wheeled carrier.

Figure 4 is a vertical section as seen on the line 4—4 of Fig. 3, looking in the direction of the arrows;

Figure 5 is an enlarged vertical section as seen on the line 5—5 of Fig. 4; and

Figure 6 is a vertical section as seen on the line 6—6 of Fig. 1.

In the drawings wherein for the purpose of illustration is shown the preferred embodiment of my invention, the numeral 1 designates generally a corn sheller which is of the well known construction and adapted to be associated therewith is the feeder extension 2. Usually the feeder extensions are constructed in separate units and when assembled for use in connection with a corn sheller extend for approximately thirty-six feet in length, thus providing a device which is very cumbersome and usually the outermost section drags on the ground. When the corn sheller is adapted to be transported, it is necessary that these sections be disassembled and removed from the corn sheller so that injury thereto will be prevented. This consumes a considerable amount of time as well as labor.

My wheeled carrier comprises the axle 3 which has its central portion arched as shown at 4 in the drawings, for the purposes to be hereinafter more fully described, and mounted on the outer ends of the axle 3 are the usual wheels 5. Secured to the axle 3 adjacent the sides of the arched portion 4 thereof are the substantially elliptical-shaped springs 6. Any suitable clamping means such as is shown at 7 in the drawings is provided for the purpose of securing and supporting the elliptical springs in position on the axle 3 adjacent the wheels mounted on the outer ends thereof.

Extending forwardly from the wheeled carrier designated generally by the letter A, are the elongated rods 8. These rods have their rear ends secured to the axle portion 3 of the carrier in any suitable manner, and the forward ends of the rods 8 are adapted to be detachably connected to the bolt 9 which extends through the sides of the feeder extension 2 in the manner as shown in the drawings and the purpose of this particular construction is to provide a means for holding the wheeled carrier in proper position with respect to the feeder extension. Suitable bracing members such as are illustrated at 10 in the drawings, extend between the elongated rods 8 and the sides of the arched portion 4 of the axle 3 for preventing the turning of the axle and thereby supporting the arched portion of the axle in a substantially vertical position, whereby the same will extend over and around the sides of the feeder extension 2.

Extending across the upper portions of the elliptical springs 6 is the transverse beam 11 and the latter is secured to the central portions of the springs 6 by any suitable clamping means as shown at 12 in the drawings. Extending upwardly from the transverse beam 11 directly above the elliptical springs 6 are the uprights or standards 13 and the purpose thereof is to provide a means for supporting the transversely extending shaft 14 which is journaled in the upper ends of the uprights. Keyed to the central portion of the shaft 14 is the gear wheel 15 and the purpose thereof will be more fully described in the following paragraph.

An auxiliary frame shown at 16 in the drawings is supported by the transverse beam 11 and journaled in the upper portion thereof is the worm gear 17, the latter being adapted to mesh with the gear wheel 15 keyed to the shaft 14 for the purpose of rotating the latter, a suitable handle 18 being associated with the worm gear for operating the same. Attached to the shaft 14 on each side of the gear wheel 15 are the chains 19. The free ends of the chains 19 are provided with hooks 20 and the chains are of such a length as to permit the hooks 20 to engage the bottom portion of the feeder extension 2 when the latter is in position within the arched portion 4 of the axle 3.

In use, the feeder extension 2 which is of any well known construction has planks secured to the sides thereof and the wheeled carrier is then placed in position over the approximate center of the feeder so that the arched portion 4 of the axle 3 will extend over the feeder, the hooks 20 on the chains 19 being then placed into engagement with the bottom portion of the feeder after the rods 8 have been attached to the outwardly extending ends of the bolt 9 which extends transversely through the sides of the feeder. The handle 18 is then actuated so as to cause the worm gear 17 to rotate the gear wheel 15 and the shaft 14 whereby the chains 19 will be wound around the shaft so as to raise the feeder off of the ground and support the same in an elevated position, whereby the feeder will not drag the ground when the corn sheller with which the same is associated is being transported. The purpose of the elliptical springs 6 is to relieve any strain which may be placed on the feeder while the same is being moved together with the corn sheller over the rough roads or fields.

It will thus be seen from the foregoing description, that a wheeled carrier has been provided which is adapted to be used in conjunction with the feeder extension of a corn sheller which will enable the former to be moved from place to place in such a position as to prevent any damage thereto while the same is in the course of transportation.

Although I have shown the feeder as connected to a corn sheller while being supported in the wheeled carrier during transportation, it is to be understood that the feeder may be detachably connected to a wagon or other moving vehicle when it is desired to transport the feeder.

The simplicity of my device furthermore enables the same to be easily and quickly placed in use and does not require the necessity of employing a number of complicated tools to adjust the various parts in an operative position and further a device is provided which is strong and durable and inexpensive.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention, what I claim is:

A wheeled carrier including an arched axle, rods carried by said axle adapted for engagement at their free ends with a support, a frame supported on said carrier above said arched axle, spring suspension means for said frame, a transverse shaft journaled in said frame, flexible members attached at one end thereof to said shaft, the opposite free ends of said flexible members having hooks carried thereon, a gear wheel keyed to said shaft, an auxiliary frame mounted on said aforementioned frame, a worm gear journaled in said auxiliary frame and adapted to mesh with said gear wheel, and actuating means therefor whereby said chains may be wound around said shaft, as and for the purposes described.

In testimony whereof I affix my signature.

WILLIAM T. CRAWFORD.